United States Patent [19]

DiGiulio

[11] 4,269,550
[45] May 26, 1981

[54] DRILL BUSHING FOR USE IN A METAL TOOLING PLATE

[76] Inventor: Mario DiGiulio, c/o Spectra Industries Corp., 405 Baily Rd., Yeadon, Pa. 19050

[21] Appl. No.: 130,519

[22] Filed: Mar. 14, 1980

[51] Int. Cl.³ .............................................. B23B 49/02
[52] U.S. Cl. .............................. 408/241 B; 408/115 B
[58] Field of Search ........... 408/241 B, 115 B, 115 R, 408/72 B

[56] References Cited

U.S. PATENT DOCUMENTS

| 2,837,942 | 6/1958 | Howell | 408/241 B |
| 3,026,749 | 3/1962 | Miller et al. | 408/241 B |
| 3,349,649 | 10/1967 | Mele | 408/241 B |
| 3,768,918 | 10/1973 | Bethke | 408/241 B |

FOREIGN PATENT DOCUMENTS

| 572034 | 3/1959 | Canada | 408/241 B |
| 947081 | 1/1964 | United Kingdom | 408/241 B |

Primary Examiner—Leonidas Vlachos
Attorney, Agent, or Firm—Howson and Howson

[57] ABSTRACT

A press-fit drill bushing for use in metal tooling plates has a circular cylindrical shank, and a toothed crown with an annular groove between the shank and the crown. The ends of the teeth adjacent the groove are disposed at an angle between zero and five degrees positive so that they form chips which are automatically packed into the groove as the bushing is pressed into a tooling plate.

8 Claims, 7 Drawing Figures

DRILL BUSHING FOR USE IN A METAL TOOLING PLATE

BRIEF SUMMARY OF THE INVENTION

This invention relates to drill bushings and specifically to a novel press-fit drill bushing adapted for mounting in a tooling plate along with other bushings to provide a jig for guiding drills in a machining operation.

For the purpose of this application the term "jig" refers to any device used in a machining operation which either holds or is held on the work, and at the same time, contains one or more guides for tools. The term "tooling plate" refers to the part of a jig on which or in which the guides are carried. The tooling plate may consist of a simple slab of metal having flat parallel faces on its opposite sides, with one or more through holes extending from one face to the other. Frequently, however, the tooling plate will have a more complex configuration, although normally it will include a section having parallel faces on opposite sides with one or more through holes.

One commonly available press-fit drill bushing is generally cylindrical in shape, and has a circular cylindrical outer surface throughout part of its length, and serrations throughout the rest of its length. The serrations are parallel to the bushing axis, and extend about one-half the length of the bushing. The purpose of these serrations is to grip the wall of a hole in the tooling plate to prevent the bushing from working loose in the drilling operation. While the serrations on this type of bushing are generally effective in preventing rotation of the bushing, they frequently cause distortion of the tooling plate. The reason for the distortion is that the tips of the serrations extend outwardly beyond the circular cylindrical portion of the bushing, and displace the metal of the tooling plate when the bushing is being press-fitted into the plate. This displacement takes place on only one side of the plate, since half of the length of the bushing that goes into the plate is serrated, while the other half is circular. The distortion of the plate becomes particularly pronounced in the cases where a large number of these bushings are installed in a small area on the plate. The distortion give rise to inaccuracies in the jig and ultimately to defects in the work being machined. The distortion problem is particularly significant when drill bushings are installed in tooling plates made of metals such as aluminum and magnesium.

Because of the distortion problems just described, tooling shops generally use straight, headless press-fit drill bushings for tooling plates made of aluminum or magnesium. The headless press-fit drill bushing has a circular cylindrical outside diameter throughout its length, and causes no distortion when pressed into an opening in a tooling plate. However, when the fixture is in use, heat generated by the operation of the drill is transmitted through the steel bushing to the magnesium or aluminum tooling plate. The coefficient of linear expansion of magnesium or aluminum is about twice that of steel. Consequently, the heat generated in drilling cause differential expansion which frequently causes the bushing to come loose. When this occurs, production has to be stopped, the tooling plate has to be cooled, and the bushing which has become loose or has fallen out of the tooling plate has to be secured in the plate with an adhesive material such as cyanoacrylate. The cyanoacrylate adhesive, however, is subject to softening when heat is applied to it. Consequently, the bushing secured by the adhesive is liable to loosen again. In most cases, jigs using headless press-fit drill bushings require frequent repair.

The principal object of this invention is to provide a press-fit drill bushing which substantially eliminates the distortion and loosening problems alluded to above.

The drill bushing in accordance with this invention is similar to conventional drill bushings in that it comprises a unitary body of hardened metal having an external shape generally in the form of a cylinder with opposite end faces and a circular cylindrical internal drill guiding passage open at both ends and extending substantially from one end face to the other. However, the bushing has: a circular cylindrical external surface coaxial with the guiding passage and extending from a first location adjacent one end face to a second location between the mid-point of the bushing and the other end face; a knurled cylindrical external surface coaxial with the guiding passage and extending from a third location adjacent said other end face to a fourth location between said second and third locations, the knurled surface having teeth extending parallel to the axis of said circular cylindrical external surface and said teeth having roots substantially aligned with said circular cylindrical external surface and tips extending outwardly beyond said circular cylindrical external surface; an annular groove in the external surface of the bushing, said groove being located between said second and fourth locations and immediately adjacent said fourth location; the teeth of the knurled section having radially extending end faces at said fourth location forming an angle between about zero degrees and five degrees positive with respect to a plane perpendicular to said cylindrical external surface whereby said teeth are able to cut into the internal surface of a cylindrical hole in the tooling plate, forming chips which are received in said groove when the bushing is pressed into the tooling plate.

The serrations prevent rotation of the bushing and also prevent it from working loose in the direction in which it is pressed into the plate. The chips are packed into the groove, and prevent the bushing from working loose in the opposite direction. Since the teeth of the bushing cut into the walls of the through holes in the tooling plate instead of displacing the metal of the plate, distortion of the plate is avoided. The result is a highly accurate and trouble-free jig having a long useful life.

DETAILED DESCRIPTION

Figure 1:
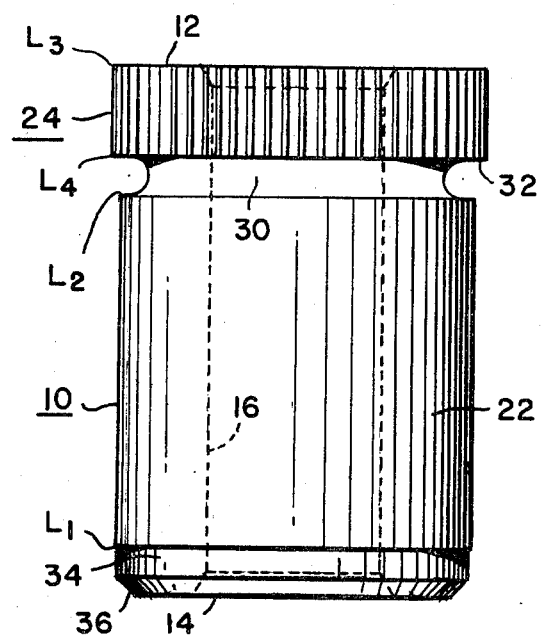
FIG. 1 is an elevation of a drill bushing in accordance with the invention in which the end faces of the teeth of the knurled section are perpendicular to the cylindrical external surface of the bushing.

Drill bushing 10, as shown in FIGS. 1-4, comprises a unitary body of hardened metal having a generally cylindrical external shape with opposite end faces at 12 and 14. Preferably, the bushing is made from a heat-treatable tool steel or a low carbon tool steel which is later carburized to achieve hardness. In either case, the bushing is heat treated to achieve a degree of hardness sufficient to resist wear in drilling.

The bushing has a circular cylindrical internal drill guiding passage 16 which extends from one end face to the other, and which is perpendicular to the end faces. Passage 16 is open at both ends, and is countersunk at 18 and 20 in order to facilitate entry of a drill from either end.

A circular, cylindrical external surface 22 is coaxial with internal passage 16, and extends from a first location $L_1$, adjacent end face 14, to a second location $L_2$ between the mid-point of the bushing and end face 12. Preferably, the axial length of external surface 22 is between approximately ⅔ and 9/10 of the distance between end faces 12 and 14. The overall length of the bushing between end faces 12 and 14 should be at least 1.5 times the diameter of internal passage 16.

Figure 2:
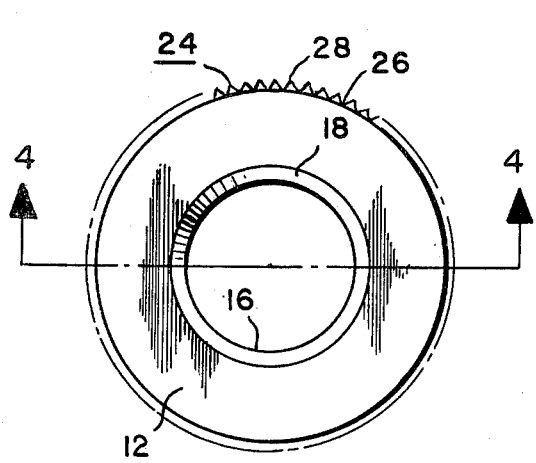
FIG. 2 is a top plan view of the bushing of FIG. 1.
Figure 3:
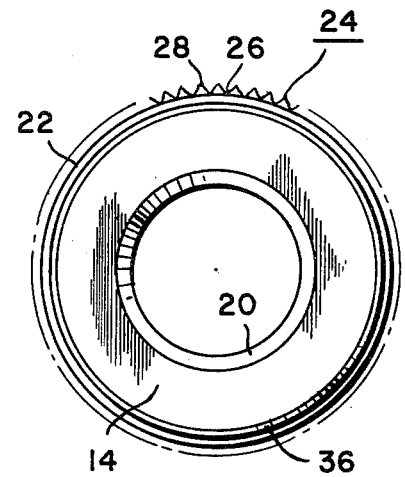
FIG. 3 is a bottom plan view of the bushing of FIG. 1.
Figure 4:
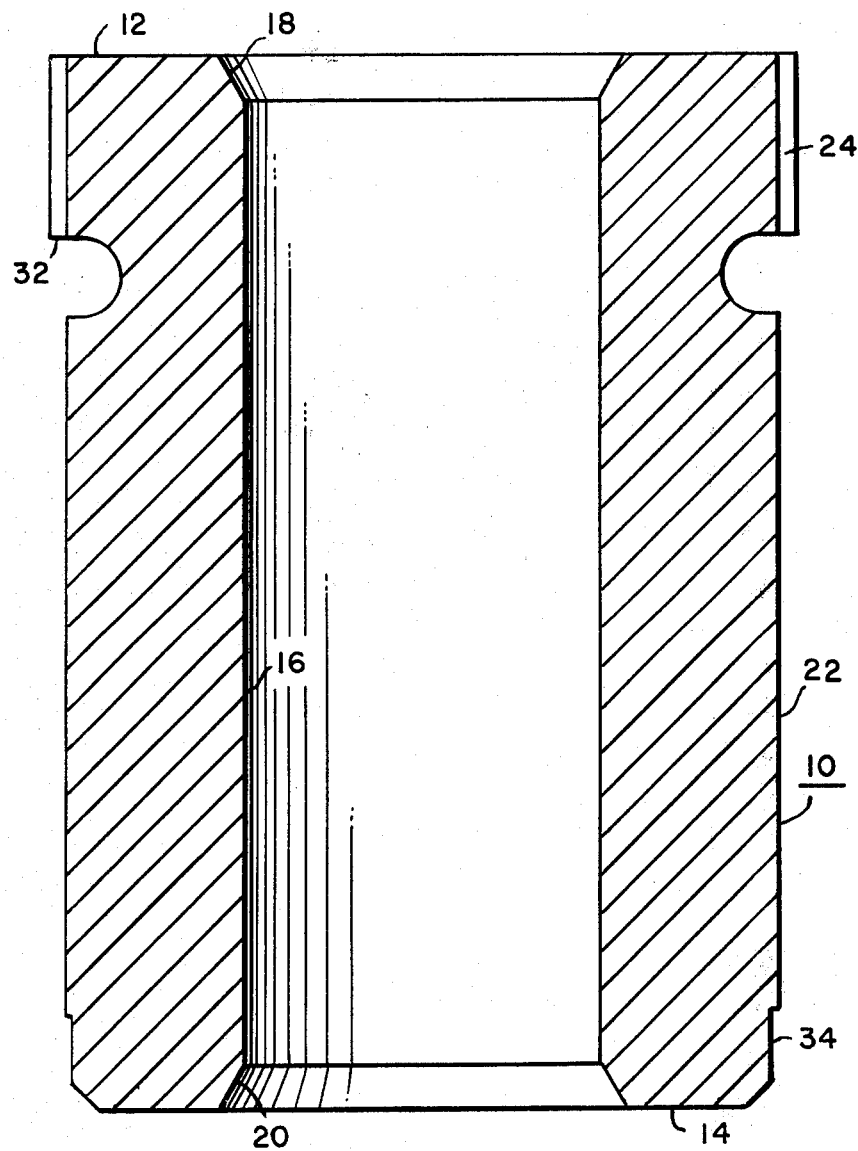
FIG. 4 is a vertical section of the bushing taken on the plane 4—4 of FIG. 2.

The bushing is provided with a knurled cylindrical external surface 24, which is also coaxial with internal guiding passage 16 and which extends from a third location $L_3$ adjacent end face 12 to a fourth location $L_4$. Location $L_4$ is between locations $L_2$ and $L_3$. Knurled surface 24 consists of a uniform series of teeth extending parallel to the axis of surface 22. As shown in FIG. 2, the teeth have roots 26 and tips 28. The roots are preferably aligned with cylindrical external surface 22 while the tips of the teeth extend outwardly beyond surface 22.

An annular groove 30 is provided between locations $L_2$ and $L_4$. Groove 30 has a minimum diameter which is slightly less than the diameter of surface 22.

The teeth of knurled section 24 have end faces at location $L_4$ which are perpendicular to the axis of surface 22. That is, end faces 32 form an angle of approximately zero degrees with respect to a plane perpendicular to surface 22. This enables the end faces of the teeth to cut into the tooling plate as the bushing is pressed into place.

An axially short circular, cylindrical lead section 34 is provided below location $L_1$ to facilitate insertion of the bushing into a tooling plate. The diameter of lead section 34 is slightly less than that of external surface 22 by two or three thousandths of an inch. Lead 34 allows the bushing to enter the prepared hole in the tooling plate freely before the bushing is pressed into place. The diameter of surface 22 should be such as to provide an interference fit with the hole in the tooling plate. Desirably, a chamfer 36 is provided at end face 14 in order to simplify the insertion of the bushing into the tooling plate still further.

Figure 5:
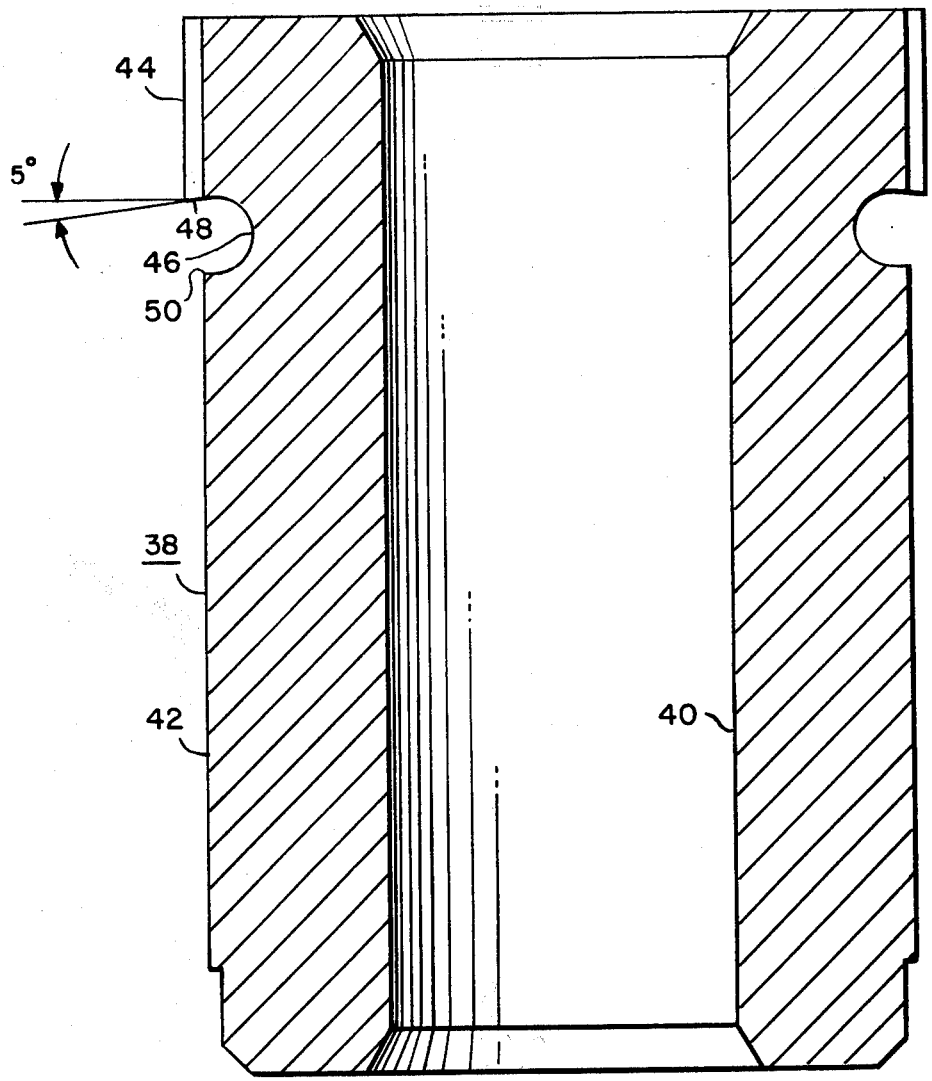
FIG. 5 is a vertical section of an alternative bushing in which the end faces of the teeth are disposed at an angle of about five degrees positive with respect to a plane perpendicular to the cylindrical external surface of the bushing.

The alternative drill bushing 38, shown in vertical section in FIG. 5, is similar to the bushing of FIGS. 1-4 in that it comprises a unitary body having a central passage 40, a circular cylindrical external surface 42, a knurled surface 44 having axial teeth, and a groove 46 between the end face 48 of the teeth and the upper end 50 of surface 42.

Bushing 38 differs from bushing 10 of FIG. 1-4 in that face 48 is disposed at a positive angle of five degrees with respect to a plane perpendicular to cylindrical surface 42. For the purpose of this application, the term "positive" refers to the fact that the tooth face is undercut. The ends of the teeth, therefore, are disposed at a positive rake angle, which improves the ability of the teeth to cut into the aluminum or magnesium tooling plate. Preferably, the angle of the end face is between zero degrees and five degrees positive, although minor deviations beyond these limits are tolerable in some cases.

Figure 6:
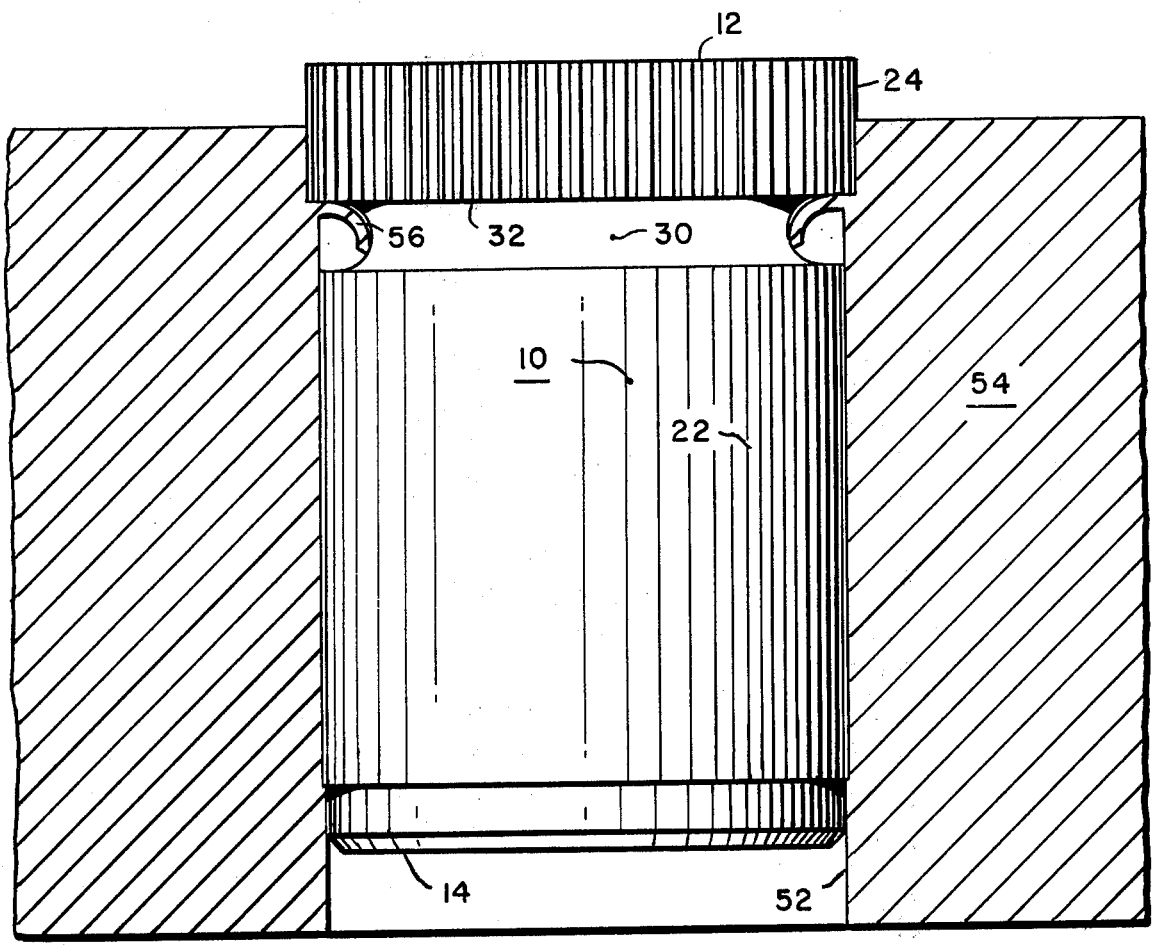
FIG. 6 is a vertical section of a tooling plate showing a drill bushing being pressed into position in the plate.

FIG. 6 shows a bushing 10 partially installed in a circular cylindrical through hole 52 in a metal tooling plate 54. The length of the bushing, between end faces 12 and 14 is equal to the length of hole 52, so that the end faces of the bushings are flush with the faces of plate 54 when the bushing is fully installed. Surface 22, which is in interference fit with hole 52 serves to guide the bushing in hole 52, as the bushing is installed by means of a press. As end face 32 cuts into the sides of hole 52, chips are formed at 56. Because knurled surface 24 consists of individual teeth, a series of chips are formed. These chips curl and enter the clearance provided by groove 30. Preferably, the annular volume provided by the groove, and bounded externally by the wall of hole 52, is related to the length of the teeth and to the extent to which the teeth project beyond surface 22 so that, when the bushing is fully installed in a plate, the chips become tightly packed in groove 30. The packing of the chips in groove 30 prevents the bushing from working its way out of hole 52, in either direction, when the tooling plate is in use. The teeth of knurled section 24 become embedded in the plate, and prevent rotation of the bushing with respect to the plate when the bushing is in use as a drill guide. Since the teeth of the knurled section of the bushing cut metal away from the wall of hole 52 rather than displace the metal of the plate outwardly, distortion of the plate is substantially eliminated. Consequently, any desired number of bushings can be installed in a given plate without impairment of the accuracy of the jig.

Figure 7:
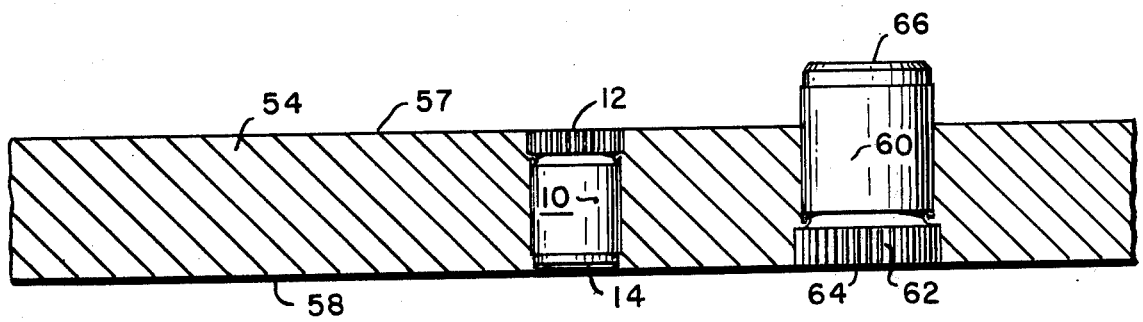
FIG. 7 is a fragmentary vertical section of a jig showing two ways in which a bushing in accordance with the invention can be installed in the plate.

FIG. 7 shows bushing 10 fully installed in plate 54. Its end face 12 is flush with top face 57 of the plate, while its end face 14 is flush with bottom face 58 of the plate.

As noted previously, for accurate guiding of drills, it is desirable for the length of the bushing to be at least approximatley 1½ times the diameter of its internal drill guiding passage. A bushing for a large diameter drill can be installed in a relatively thin plate in the manner illustrated in FIG. 7, in which bushing 60 is installed in plate 54. The knurled section 62 of bushing 60 is located adjacent bottom face 58 of the plate so that end face 64 of the bushing is flush with face 58 of the plate. The opposite end of bushing 60 extends well beyond upper face 57 of the plate. Since the drill guiding passage of bushing 60 is countersunk at both ends, a drill can readily be introduced into the drill guiding passage of bushing 60 at end face 66. Thus, both bushings in FIG. 7 can be used simultaneously, even though they are disposed in opposite directions. The provision of countersinks at both ends of each bushing therefore substantially improves the versatility of the bushings.

Various modifications to the bushings, including modifications to the tooth configuration can be made without departing from the scope of the invention as defined in the following claims.

I claim:

1. A drill bushing for use in a metal tooling plate comprising a unitary body of hardened metal having an external shape generally in the form of a cylinder with opposite end faces and a circular cylindrical internal drill guiding passage open at both ends and extending substantially from one end face to the other, said bushing having: a circular cylindrical external surface coaxial with the guiding passage and extending from a first location adjacent one end face to a second location between the mid-point of the bushing and the other end face; a knurled cylindrical external surface coaxial with the guiding passage and extending from a third location adjacent said other end face to a fourth location between said second and third locations, the knurled surface having teeth extending parallel to the axis of said circular cylindrical external surface and said teeth having roots substantially aligned with said circular cylindrical external surface and tips extending outwardly beyond said circular cylindrical external surface; an annular groove in the external surface of the bushing, said groove being located between said second and fourth locations and immediately adjacent said fourth location; the teeth of the knurled section having radially extending end faces at said fourth location forming an angle between about zero degrees and five degrees positive with respect to a plane perpendicular to said cylindrical external surface whereby said teeth are able to cut into the internal surface of a cylindrical hole in the tooling plate, forming chips which are received in said groove when the bushing is pressed into the tooling plate.

2. A drill bushing according to claim 1 the external surface of which has a circular cylindrical lead section extending through a short distance substantially from said one end face to said first location adjacent said one end face, said lead section having an outer diameter slightly less than that of said circular cylindrical external surface.

3. A drill bushing according to claim 1 in which the internal drill guiding passage is countersunk at both ends.

4. A drill bushing according to claim 1 in which the axial length of said circular cylindrical external surface is between approximately ⅝ and 9/10 of the distance between said end faces.

5. In combination with a metal tooling plate having flat, parallel faces on opposite sides and at least one cylindrical through hole extending from one of said faces to the other, a drill bushing comprising a unitary body of hardened metal having an external shape generally in the form of a cylinder with opposite end faces and a circular cylindrical internal drill guiding passage open at both ends and extending substantially from one end face to the other, said bushing having: a circular cylindrical external surface coaxial with the guiding passage and extending from a first location adjacent one end face to a second location between the mid-point of the bushing and the other end face; a knurled cylindrical external surface coaxial with the guiding passage and extending from a third location adjacent said other end face to a fourth location between said second and third locations, the knurled surface having teeth extending parallel to the axis of said circular cylindrical external surface and said teeth having roots substantially aligned with said circular cylindrical external surface and tips extending outwardly beyond said circular cylindrical external surface; an annular groove in the external surface of the bushing, said groove being located between said second and fourth locations and immediately adjacent said fourth location; the teeth of the knurled section having radially extending end faces at said fourth location forming an angle between about zero degrees and five degrees positive with respect to a plane perpendicular to said cylindrical external surface whereby said teeth are able to cut into the internal surface of said cylindrical through hole in the tooling plate, forming chips when the bushing is pressed into the tooling plate; at least part of said circular cylindrical external surface being located in said through hole and in press-fit relationship therewith, and said knurled surface being also located in said through hole with its teeth embedded in the wall of said through hole, said chips being received by and located in said groove.

6. The combination according to claim 5 in which each end face of the bushing is substantially flush with a face of the tooling plate.

7. The combination according to claim 5 in which said other end face of the bushing is substantially flush with one face of the tooling plate, and the length of the bushing is greater than the thickness of the tooling plate so that said one end face of the bushing is spaced outwardly from the other face of the tooling plate.

8. The combination according to claim 5 in which said chips are tightly packed in said groove whereby the bushing is locked against axial movement in said through hole.

* * * * *